United States Patent [19]

Newsom

[11] Patent Number: 4,591,929
[45] Date of Patent: May 27, 1986

[54] INTERACTIVE LEARNING PROGRAMMING AND LIKE CONTROL CIRCUITRY

[76] Inventor: Harley M. Newsom, 115 Via Santa Maria, Los Gatos, Calif. 95030

[21] Appl. No.: 630,521

[22] Filed: Jul. 13, 1984

[51] Int. Cl.[4] .................. G11B 5/00; G09B 50/004
[52] U.S. Cl. .................................... 360/32; 434/319
[58] Field of Search .............. 434/156, 157, 167, 168, 434/169, 185, 319; 360/32, 5

[56] References Cited

U.S. PATENT DOCUMENTS

| 3,765,106 | 10/1973 | Cornell, III | 35/35 |
|---|---|---|---|
| 4,141,039 | 2/1979 | Yamamoto | 358/127 |
| 4,150,397 | 4/1979 | Russell | 358/127 |
| 4,206,476 | 6/1980 | Hashimoto | 358/127 |
| 4,246,615 | 1/1981 | Shiraishi et al. | 360/8 |
| 4,246,617 | 1/1981 | Portnoff | 360/32 |
| 4,286,294 | 8/1981 | Nakauchi et al. | 360/27 |
| 4,295,154 | 10/1981 | Hata et al. | 358/4 |
| 4,328,580 | 5/1982 | Stockham, Jr. et al. | 371/8 |
| 4,329,708 | 5/1982 | Yamamoto et al. | 358/36 |
| 4,333,160 | 6/1982 | Kobari et al. | 364/900 |
| 4,353,129 | 10/1982 | Nishiwaki | 358/19 |
| 4,363,049 | 12/1982 | Ohtsuki et al. | 360/13 |
| 4,363,050 | 12/1982 | Modla | 360/32 |
| 4,368,988 | 1/1983 | Tahara et al. | 368/63 |

FOREIGN PATENT DOCUMENTS 2434440  3/1980  France .............................. 360/137
147760  11/1980  Japan ............................... 360/137

OTHER PUBLICATIONS

"Compression of Silence in Digitized Speech Recording"—M. Patten, IBM TDB, vol. 20, #4, Sep. 77.

Primary Examiner—Vincent P. Canney
Attorney, Agent, or Firm—George E. Roush

[57] ABSTRACT

Learning additional languages and similar subject matter wherein repetition and comparison of spoken phrases is of value is enhanced by this electronic circuitry auxiliary to the conventional magnetic tape recorder. The circuitry according to the invention comprises an addressable electronic store, control circuitry, therefor arranged for storing a plurality of messages or texts in separate locations, and converting circuitry for converting analog signals emanating from the recorder or from a microphone used by the learner into digital signals for storage and for converting the digital signals into analog signals for reviewing aurally. Four modes of operation are available. Full electronic control and interlock are provided with easy manipulation of four switches and one gain control element.

20 Claims, 7 Drawing Figures

INTERACTIVE LEARNING PROGRAMMING AND LIKE CONTROL CIRCUITRY

FIELD

The invention relates to auxiliary electronic recorder/reproducer apparatus to be used with a conventional type tape "recorder" or other source of audio in the learning of a foreign or second language or other information where repetition of playback and voice recording and playback by the student are important.

BACKGROUND

In the study of foreign language, for example, it is possible to purchase cassette tapes or records of words and phrases. However, in using them, it is difficult to rewind the tape to repeat the phrase and difficult or impossible to record and playback the student's voicing of the word or phrase. If a loop recorder is used, the loop length is fixed and the entire loop must be traversed before a phrase can be repeated. These difficulties severely limit the learning process.

The invention combines an all electronic recording and reproducing storage means with a conventional magnetic tape "recorder", which is at the same time a "player" or other source such that the last phrase from the source is held in an electronic store, and can be reproduced as many times as desired by the student without having to rewind or backspace the source.

By the same process, the student can record his voicing of the phrase in a different portion of the electronic memory and can then selectively reproduce the teaching phrase or his response, re-recording his voicing until satisfied.

The application of the invention already discussed and to be discussed in greater detail hereinafter relates to the application of the invention to the learning of a foreign or "second" language. However, it would be apparent that the invention also has application in learning by the visually handicapped or in speech therapy where repetition and or record/playback by the user are important.

There is a demand for an electronic store and the means to convert the audio information into digital form for storage in the store and means for converting the digital information stored in the store back into audio form on reproduction.

There is also a demand for control circuitry to selectively record from several sources and to enable selective reproduction of the information stored. This circuitry automatically assigns a starting address for each record and keeps track of that address and the ending address enabling the selective playback of each record even though the various records are stored contiguously in the same electronic store.

It is desired that control circuitry be available for the selective generation of a "side tone" during recording. For instance, when recording from a tape source, it is desirable to have a side tone; when recording the student voicing, a side tone is undesirable.

SUMMARY

In accordance with the invention, the objects of the invention indirectly referred to hereinbefore and those that will appear as the specification progresses obtain with electronic auxiliary apparatus arranged for pluggable electronic connection to conventional magnetic tape recorders having external speaker, or other electromagnetic transducer, connecting jacks and external operating switch connecting jacks. The apparatus according to the invention comprises electronic storage circuitry for recording textual and like data as the recorder is reproducing data previously recorded on magnetic tape (or disk). Converting circuitry is arranged for converting analog data delivered at the output of the recorder into digital form for storage in the storage circuitry and electronic control circuitry is arranged for controlling the various operations as the operator (student) wishes. The electronic control circuitry is arranged for selectively connecting a microphone to the conversing circuitry along with the recorder whereby a record may be made of pre-recorded message on tape in one storage location and an orally delivered "copy" of that message forms another record, after which these records are alternatingly reproduced for comparison by the student as long as desired before progressing to the next learning step.

A delta modulator/demodulator circuit and a series/parallel digital data converter circuit are connected in a loop circuit arrangement which is arranged to accept analog and digital data selectively and selectively to deliver serial and parallel digital data and analog data.

PRIOR ART

Prior art systems having some structure in common with that according to the invention is found in these U.S. Pat. Nos.:

3,765,106 10/1973 Cornell 35/35C
4,141,039 2/1979 Yamamoto 358/127
4,150,397 4/1979 Russell 358/127
4,206,476 6/1980 Hashimoto 358/127
4,246,615 1/1981 Shiraishi et al 360/8
4,246,617 1/1981 Portnoff 360/32
4,286,294 8/1981 Nakauchi et al 360/27
4,295,154 10/1981 Hata et al 358/4
4,328,580 5/1982 Stockham et al 371/8
4,329,708 5/1982 Yamamoto et al 358/36
4,333,160 6/1982 Kobari et al 364/900
4,353,129 10/1982 Nishiwaki 375/112
4,363,049 12/1982 Ohtsuki et al 360/13
4,363,050 12/1982 Modla 360/32
4,368,988 1/1983 Tahara et al 368/63
In foreign patents:
France No. 2,434,440 3/1980 Rigolet
Japan No. 55-147760 11/1980 Sado
And in the literature:
Patten, M. A.; "Compression of Silence in Digitized Speech Recording" IBM Technical Disclosure Bulletin, Vol. 20, Nr. 4, September 1977, pp. 1568–71.

The patent to Cornell is but an example of prior art attempts using magnetic tape storage in an electromechanical arrangement and an "endless tape" approach from which the arrangement of the invention differs.

The patents to Yamamoto and to Yamamoto and Yoshimoto are directed to time base differential systems which permit read in at one rate and read out at another; digital storage of the two are involved. Comparison of signals as in the arrangement of the invention is not shown.

The patent to Russell discloses a record and playback system for reducing redundancy in which a digital word-to-digital word compare is made internally of the system. Neither structure nor function anticipates the learning system according to the invention.

The patents to Hashimoto, to Shiraishi, to Portnoff each are directed to systems where in the time rate of handling signals is varied which requires holding storage. The functioning does not approach that of the learning system according to the invention.

A recording/reproducing system of interest is disclosed by Nakauchi and Watse wherein an analog distortion signal is digitized for connecting the translated signal. Here enhancement is in the reproduction, not in the learning as with the arrangement of the invention.

There are substructures of interest in the patents to Hata, Haji, Sako, Shibata and Archiha; to Stockham and Rothaar; to Nishiwaki, to Ohtsuki, Kazami, Anjyu; to Kobari, Yamada, Suzuki, and Hibino; and to Nishiwaki, and to Tahara, Aihara, Takahashi, Matsuo and Wakabayashi in that there are various arrangements to Analog-to-Digital Converters and digital data stores responsive to control circuitry for performing various functions other than the repeated playback for comparison of passages by the student operator as in the arrangement according to the invention.

Modla discloses a delta modulator circuit and a digital data storage circuit and control circuitry for selectively modulating and demodulating signals which may be filtered for approximately reproducing the analog signal. The structure and function differ from that of the circuit arrangement according to the invention.

The publication to Patten discloses a circuit arrangement useful with the circuit arrangement of the invention for compressing data in silent periods which is quite useful in learning applications.

The French patent and the Japanese patent are directed to electronic circuitry for translating different languages using magnetic tape recorders and control circuitry for searching for the literal translation of a passage. Neither the circuit arrangements nor the functions anticipate the learning system according to the invention.

DRAWING

In order that all of the advantages of the invention obtain in practice, the best mode embodiment thereof, given by way of example only, is described in detail hereinafter with reference to the accompanying drawing, forming part of the specification, in which.

DESCRIPTION

Functional Arrangement

Figure 1:
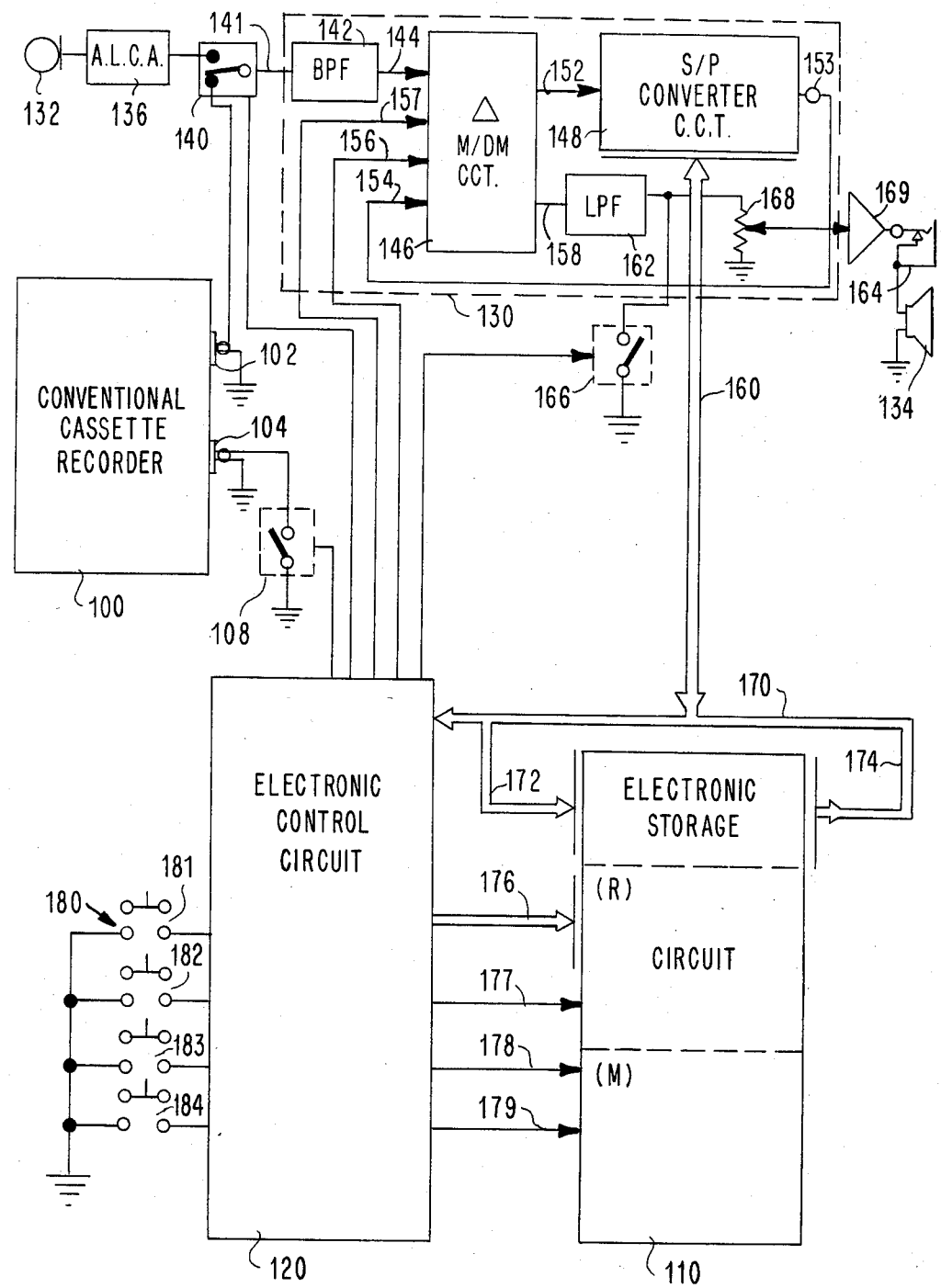
FIG. 1 is a functional diagram of a system according to the invention as applied to a learning installation.

Referring to FIG. 1, there is shown a functional diagram of an installation comprising a conventional audio cassette "recorder" 100, an electronic data storage circuit 110 and an electronic control circuit 120 therefor according to the invention, reversible analog-to-digital data converting circuitry 130 according to the invention and, such as a microphone 132 and a speaker 134, with necessary support circuitry interconnected according to the invention for repetition of selected data useful in learning and like applications.

The "recorder" 100, for example a conventional audio frequency magnetic tape cassette "recorder," which is conventionally both a recorder and a player in fact, including output terminals 102 at which an analog signal corresponding to the information recorded on the magnetic tape of a cassette is delivered and remote control switch terminals 104 to which a single-pole-single throw switch module 108 is connected for controlling the movement and play of the magnetic tape recorded message. Those skilled in the art will substitute other sources of input signal capable of being controlled by a simple switch module where this is necessary or merely desirable. The microphone 132, together with a preamplifier 136, is just such a signal generator especially useful in a learning oriented installation.

The output terminals 102 of the "recorder" 100 and the output terminals of the microphone preamplifier and level control circuit 136 are connected to the terminals of a selector switch module 140, which leads to input terminals 141 of the converting circuitry 130. The module 140 is one of many such conventional electronic circuit modules readily available in the market; this one being the equivalent of a single-pole-double-throw electric switch and controlled by a level furnished from the electronic control circuitry 120. The selector arm equivalent of the switch module 140 is connected to a bandpass filter circuit 142 which in turn is connected to a delta modulator/demodulator (M/DM) circuit 146. A series/parallel (S/P) converter circuit 148 is connected in a series between output terminals 152 and digital input terminals 154 of the M/DM circuit 146. A parallel output-input bus 160 is a part of the S/P converter circuit 148. Clocking wave terminals 156 lead to the control circuit 120. Analog signal output terminals 158 of the M/DM circuit 146 are connected to a low pass filter circuit 162, the output of which may be muted by means of an electronic switch module 166 controlled by the electronic control circuit 120. The reconstituted analog signal from the filter 162 is attenuated by means of a gain setting potentiometer 168 in the input circuit of an audio frequency amplifying circuit 169. The speaker 134 is connected to the output terminals of the amplifying circuit 169, preferably through an earphone connecting jack 164.

The control circuitry 120 also is arranged for operating a cassette recorder control switch module 108, for providing a clocking wave to input terminals 156 and for controlling another switch module located within the M/DM circuit 146, as later will be described, for determining modulation or demodulation operation.

The parallel digital data output terminals of the converter circuit 130 lead to the storage circuit 110 and the control circuit 120 by way of the bus 160 and branch busses 170, 172 and 174 so referenced for convenience in describing circuit operation later. An address bus 176, an address data strobe line 177, a storage cycle line 178 and a record/reproduce signal line 179 lead from the control circuitry 120 to the storage circuit 110 for use as will be disclosed hereinafter. An operator's control switch bank 180 comprises four manual, preferably pushbutton switches 181, 182, 183 and 184 complete the essentials of the functional circuitry according to the invention.

Referring to the showing in FIG. 1, the system according to the invention is arranged upon the application of energizing power selectively for:

A. Starting and stopping the cassette recorder 100 in conventional "playback" mode while also recording the information from the magnetic tape in the cassette in digital form in the electronic storage unit 110; this is termed the RECORD MASTER mode.

B. Playing back the information just stored in the storage unit 110, as often as may be desired; this is termed the PLAYBACK MASTER mode.

C. Recording a (student) response made by way of the microphone 132, or some similar device, in the electronic storage unit 110 at a storage location different of course from that of the master record; this is termed the RECORD RESPONSE mode.

D. Playing back the (student) response from the electronic storage unit 110, as often as may be desired and/or alternately with playing back the master for comparing the two sets of information stored; this naturally is termed the PLAYBACK RESPONSE mode.

The control circuit 120 is arranged for addressing the storage circuit 110 in response to actuation of the switches in the bank 180 so that just the length of recorded passages is played, thus obviating the fixed length tape loop processing problem. The circuitry of the control circuit 120 is arranged immediately on power up to go into an IDLE mode in which the four operative modes are checked, to go into the one of the four operating modes selected by actuation of one of the four operating switches 181 . . . 184, and to maintain the IDLE mode if more than one of the four operating switches is selected.

The control circuit is so arranged that in response to actuation of the record master switch 181, the recorder remote switch module 108 will be closed, the selector switch module 140 will select the cassette recorder 100 terminals 102, set the M/DM circuit to the encode mode, the mute switch module 166 will be opened for delivering the audio frequency signal from the recorder 100 to the speaker 134.

The audio frequency signal from the recorder 100 is band limited in the bandpass filter 142 and is converted by the M/DM circuit 146 into a serial binary sequence in synchronism with a clocking wave from the control circuit 120 applied at terminal 156. This serial data, digital output at terminals 152 is deserialized in the S/P converter circuit 148 into data words. As each word is deserialized, it is transferred over the parallel data busses 160 and 170 to the control circuit 120 and over bus 172 to the electronic circuit 110. The control circuit 120 comprises a conventional address register of the electronic counter type. The control circuit 120 is arranged with a predetermined starting address, termed the MASTER STARTING LOCATION, in the address register, at which location in the electronic storage circuitry this first data word is entered. Concurrently, this address is also entered into a temporary MASTER ENDING LOCATION register later to be discussed. At the conclusion of writing, the address is incremented by one unit to form the address for the next data word.

If any one of the control switches 181, 182, 183, or 184 is altered, control circuit 120 is reverted to the IDLE mode turning off the cassette recorder 100 and the MUTE switch 162 is activated.

If the status of the CONTROL SWITCHES in the bank 180 is unchanged, the CONTROL circuit 120 awaits another data word and then stores this word by the same sequence of steps as before. This process continues until the RECORD MASTER switch 181 is de-actuated and in all instances before going to the idle mode, the CONTROL circuit 120 stores the value of the last address used in a temporary register. The MASTER STARTING LOCATION and the MASTER END LOCATION are then known and are used to delimit the playback.

The control circuit 120 is so arranged that in response to actuation of the PLAYBACK MASTER switch 182, the M/DM circuit is placed in the decode mode by a level on line 157 transmitted from the control circuit 120; the MUTE switch 162 is deactivated and the operation within the control circuitry retrieves the first word of data stored at the MASTER STARTING location. This data word is transferred by the CONTROL CIRCUIT 120 over the DATA BUS 170, 160 to the SERIES/PARALLEL CONVERTER 145. The S/P converter circuit 148 serializes the data for input at digital data input terminal 154 to the M/DM circuit 146 in synchronism with the clock from the control circuit 120. The M/DM circuit 146 decodes the digital input signal at terminal 154 into analog output signal at terminals 158 in synchronism with a clock at terminal 156 from CONTROL CIRCUIT 120. The AUDIO OUTPUT at terminal 158 is filtered by the low pass filter circuit 162, amplified in the amplifier circuit 169 and reproduced on an earphone at jack 164 or on the speaker 134.

Following translating the data word to the SERIES/PARALLEL CONVERTER, the last address obtained from the converter is compared with the value stored in the MASTER END LOCATION REGISTER. If they are identical, the playback is stopped and the MUTE switch 166 is actuated. The control will stay in this state until the PLAYBACK MASTER switch 182 is deactuated.

If the two addresses differ, the address is incremented by one unit to form the address for the next read from the STORAGE 110. At the conclusion of forming the new address, the control switches in the bank 180 are tested. If any has changed, the CONTROL CIRCUIT 120 goes into IDLE mode awaiting a new single switch actuation. If the switch state has not changed, the above sequence repeats until either the MASTER END LOCATION ADDRESS is reached and/or the PLAYBACK MASTER switch 182 is deactuated.

If the two addresses differ, the address is incremented by one unit to form the address for the next read from the STORAGE 110. At the conclusion of forming the new address, the control switches in the bank 180 are tested. If any has changed, the CONTROL CIRCUIT 120 goes into IDLE mode awaiting a new single switch actuation. If the switch state has not changed, the above sequence repeats until either the MASTER END LOCATION ADDRESS is reached and/or the PLAYBACK MASTER switch 182 is deactuated, The circuitry according to the invention is so arranged that on actuation of the RECORD RESPONSE switch module 183, the selector switch module 140 is arranged effectively to connect the microphone 132 and the audio level controlling and preamplifying circuit 136 to the input circuit of the bandpass filter circuit 142, to place the M/DM circuit 146 in the encode mode and to activate the mute switch module 166 for preventing a side tone from reaching the earphone jack 164 or the speaker 134.

The signal at the Audio Input terminal 144 is converted in the M/DM circuit to a serial binary sequence Digital Output signal at terminal 152 in synchronism with a clock wave supplied by the Control Circuit 120. The Digital Output signal at terminal 152 is deserialized in the S/P Converter Circuit 148 into data words. When a word has been accumulated, it is entered by way of the Data Bus 160 into the Control Circuit 120. The Control Circuit 120 is arranged to enter that data into the Storage Circuit 110 at an address termed the Response Starting Address. The numerical value of this Response Starting Address location is equal to the numerical value of the Master End location plus one unit and is formed by the Control Circuit 120 from a temporary storage register in the Control Circuit 120 that contains the Master End Address Location.

Concurrent with entering the data word into storage, the address used is written into a response End Location Register.

Following this, the address is incremented one unit to form the address for storage of the next data word. If the status of the control switch bank 180 has not changed, the system is still in the RECORD RESPONSE mode and upon completion of deserializing the next data word the above sequence repeats until the RECORD RESPONSE is deactivated.

The starting and ending addresses are known and are used to delimit the playback.

The response message is played back by actuating the PLAYBACK RESPONSE Switch 184; upon this switch being actuated, events identical to those occurring when playing back the master message occur except that the starting and ending addresses are the Response Start Location and Response End Location addresses.

CONTROL TIMING

Figure 2:
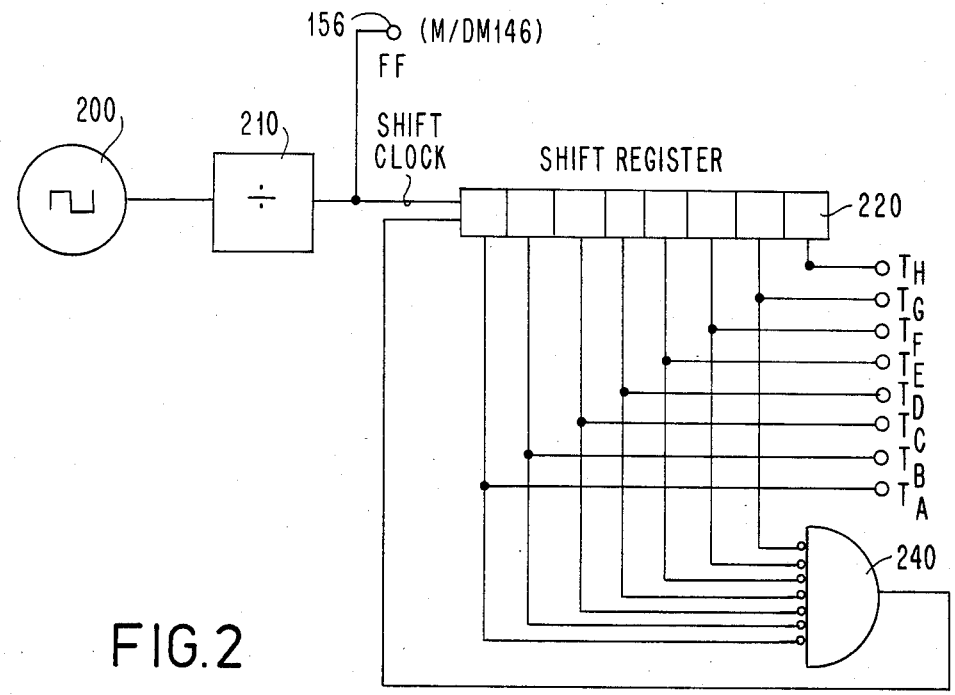
FIG. 2 is a functional diagram of a timing wave generating circuit arrangement.
Figure 3:
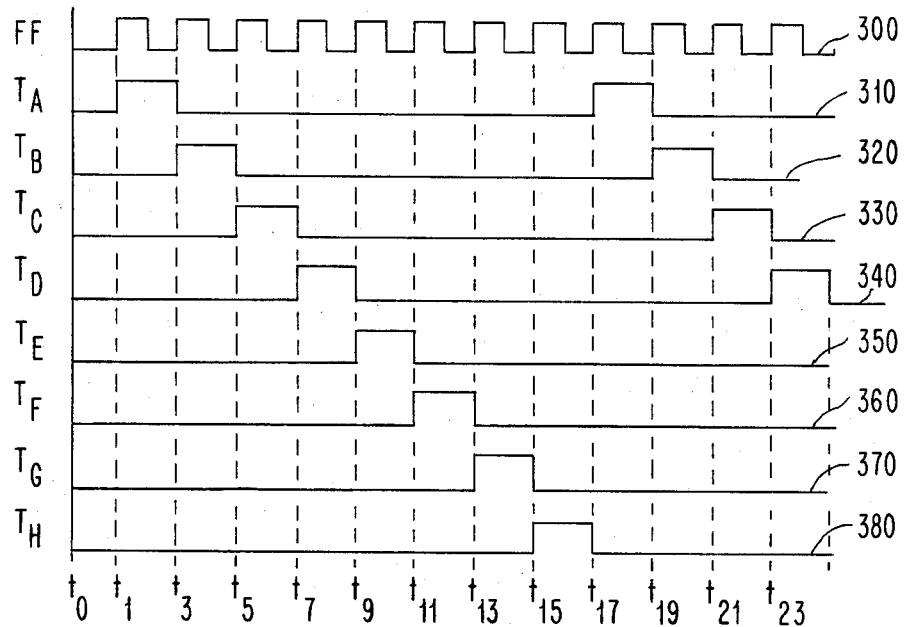
FIG. 3 is a graphical representation of timing waves generated in the circuit arrangement shown in FIG. 2 and used in the system shown in FIG. 2.

The circuitry according to the invention is so arranged that all the control operations for converting the audio input to a binary serial sequence or for converting a binary serial sequence to audio and for performing all storage entry and retrieval operations are made synchronously with an eight-phase clock. FIG. 2 is a functional diagram of one implementation for such a clock. A stable oscillating circuit 200 is connected by way of a binary divider circuit 210 to an eight-stage shift register circuit 220 having an 8 input-lead NAND gating circuit 240 arranged as shown for providing the shift pulses. The frequency of the clocking wave at the clocking wave terminal 156 and at the input to the shift register 220 is not critical; a frequency of 32 Kilohertz will be found satisfactory as it is merely a function of the rate at which it is desired to digitize the audio frequency waves. FIG. 3 is a graphical representation of waveforms 310 to 380 of the eight phases of the clocking wave 300. After the first eight shifts after power on, each stage of the shift register will have an output wave as shown in FIG. 3; these phases are labelled TA through TH. These eight clock phases and the fundamental clock wave synchronize all control operations to be described hereinafter.

OPERATOR SWITCH CONTROL CIRCUITRY

Figure 4:
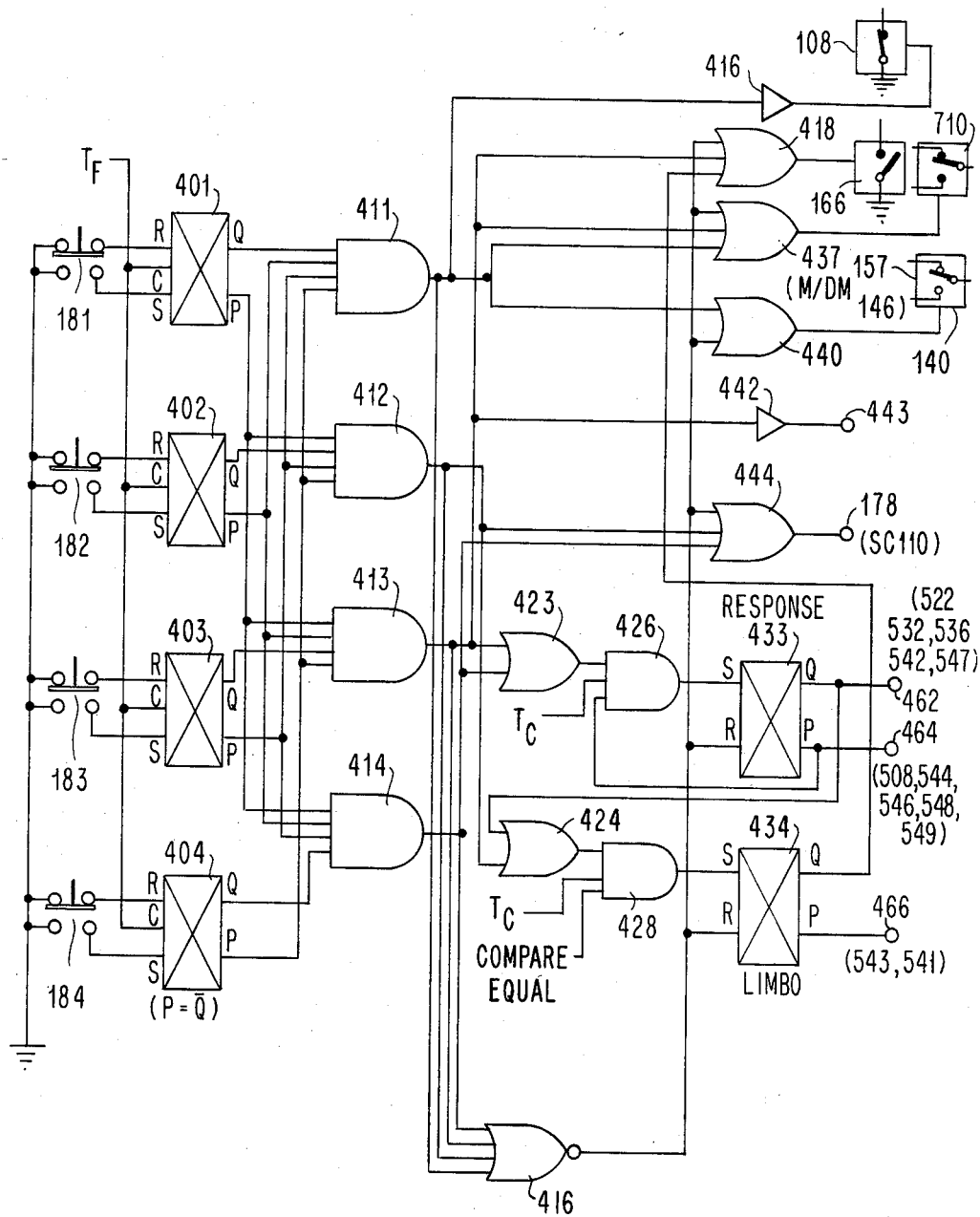
FIG. 4 is a logical circuit diagram of the operating switch and control circuitry according to the invention.

FIG. 4 is a logical diagram of the operator switch control circuitry for controlling the modes of operation according to the invention.

Each switch 181-184 is de-bounced by a set-reset flip flop circuit 401-404. At each $T_F$ phase time the state of the switches is clocked into the flip flop circuits. The AND gating circuits 411-414 on the output of the flip flop circuits are arranged to decode the switch operation and to ensure that there is no action unless one, and only one, switch is actuated, thereby preventing ambiguous operations being signalled. The NOR gating circuit 416 labelled IDLE and AND gating circuits 411-414 ensure that if no switch or more than one switch is operated, an IDLE command is forced.

Other logical circuitry shown is arranged to decode the switch settings to generate signals to control the MUTE switch 166, Delta M/DM circuit 146 ENCODE/DECODE switch module 710, Source switch module 140, the WRITE/READ level signal to the Storage Circuit 110 and the Remote Control switch module 108.

Figure 5:
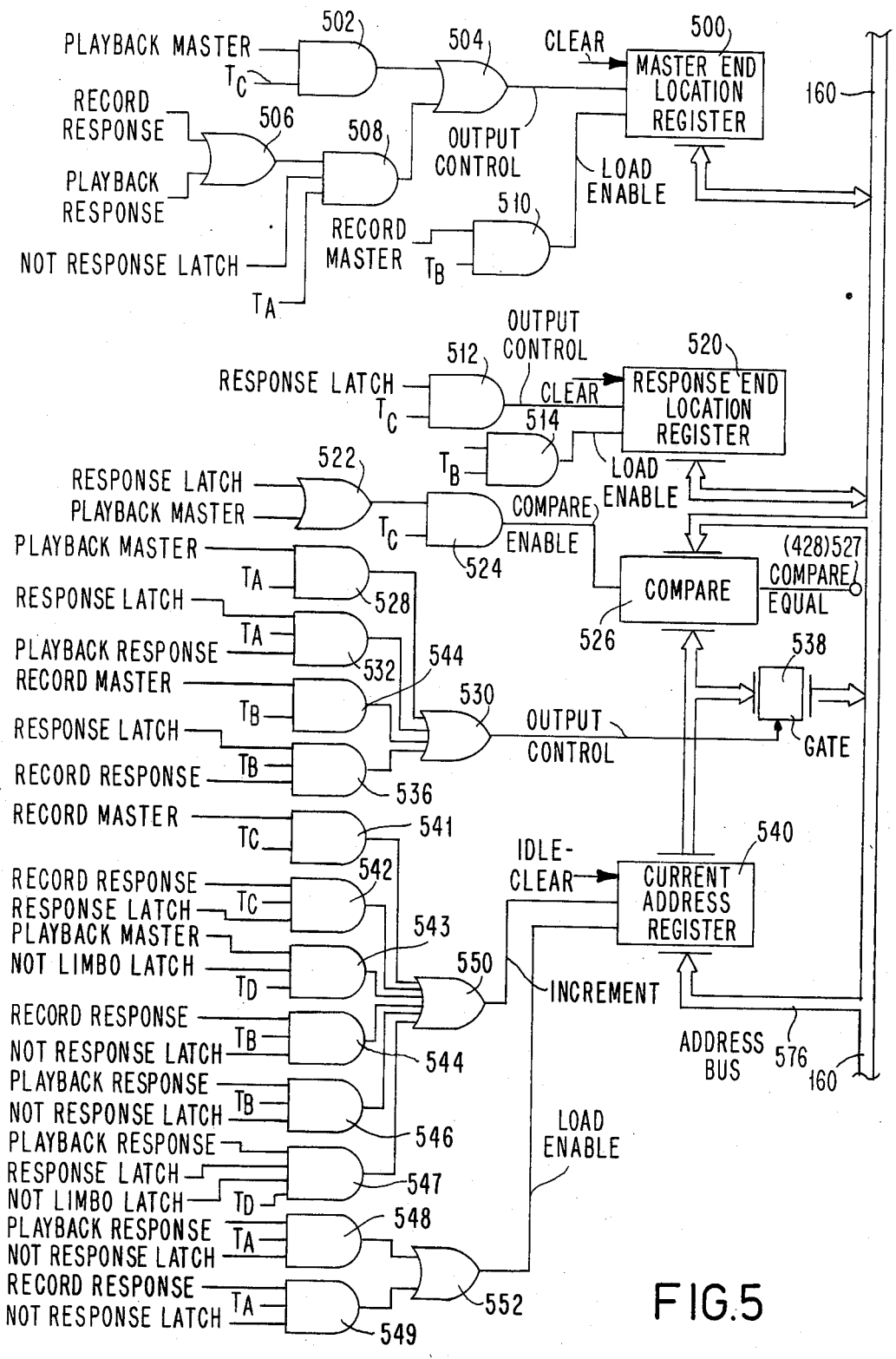
FIG. 5 is a logical circuit diagram of the address bus control circuitry according to the invention.
Figure 6:
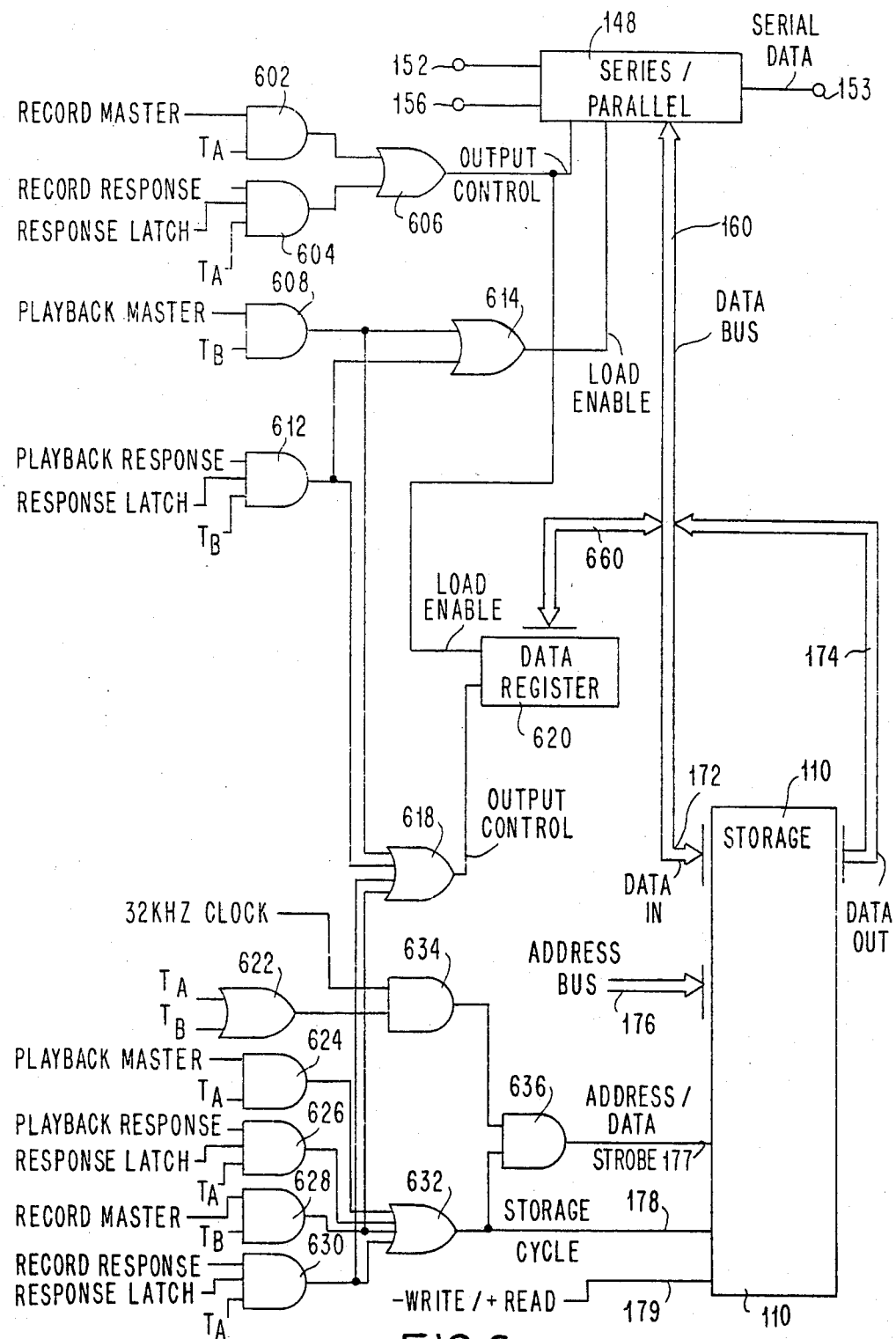
FIG. 6 is a logical circuit diagram of the control circuitry of the series/parallel converter and the data store according to the invention.

Two other circuits, the RESPONSE LATCH 433 and LIMBO LATCH 434 arranged to generate signals to control the operation of the Address Registers 500, 520, 540 shown in FIG. 5 and to control the S/P Converter Circuit 148 and Storage Circuit 110 shown in FIG. 6.

RECORD/PLAYBACK ADDRESS/DATA CONTROL CIRCUITRY

FIGS. 5 and 6 are more logical circuit diagrams of the control circuit arrangements according to the invention for reading into and out of storage, for generating read/write addresses, and for reading from, writing to, and shifting the S/P Converter Circuit 148.

The circuitry is so arranged that when the RECORD MASTER switch 181 is operated, the following sequence of operations occur. The serial binary sequence from the Delta M/DM circuit 146 enters the input terminal 152 of the S/P Converter Circuit 148 in FIG. 6 and is shifted into the converter in synchronism with the system clock wave. At each TA phase time $t_1$ the converter Output Control level is enabled by logical gating circuits 602 and 606 placing the data word in the converter on the Data Bus 160. Simultaneously, through gate 606 DATA REGISTER 620 is enabled to accept data from the Data Bus 660. Thereby, the data word in the Converter Circuit 148 is written to the Data Register 620.

At the next $T_B$ phase time $t_3$, a storage cycle is generated by logical gating circuits 628 and 632, the contents of the Current Address Register 540 are placed on the Address Bus 560 by way of logical gating circuits 530, 538 and 544, and the contents of the Data Register 620 are entered into the Storage Circuit 110 at the address contained in the Current Address Register Circuit 540. Simultaneously, the address on the Address Bus 560 is written into the Master End Location Register Circuit 500 by way of AND gating circuit 510.

At the following $T_C$ phase time $t_5$, the Current Address Register Circuit 540 is incremented by one unit by way of logical gating circuit 541 and 550, forming the address for the next entry.

At $T_F$ phase time, if the operator control switch setting has changed, control reverts to the IDLE mode. The Master End Location is stored in the Master End Register Circuit 500; thereby delimiting the master message.

If the switch status has not changed, the system remains in the RECORD MASTER mode and upon completion of the deserializing function, the next data word in the S/P CONVERTER circuit 148 as triggered on the appearance of the pulse at phase time $t_1$ (TA), the above events repeat until the operator RECORD MASTER switch is deactuated, placing the system in the IDLE mode.

In all instances, after the RECORD MASTER switch 181 is deactuated and control has reverted to IDLE mode, the Master End Location address is stored in the Master End Location Register Circuit 500 and can be used to delimit the master record on playback.

If the RECORD RESPONSE Switch 183 is actuated, the following sequence of events occur:

At the next occurrence of $T_F$ phase time $t_{11}$, the switch status is set into the de-bounce flip flop circuits 401–404, and the levels for Mute, +Encode, Response Source and −Write are made active.

The serial binary sequence from the Delta M/DM circuit 146 enters by way of the input terminal 152 of the S/P Converter circuit 148 (FIG. 5) and is shifted into the converter 148 in synchronism with the system clock wave.

At the next $T_A$ phase $t_1$ time, the contents of the Master End Location Register Circuit 500 are delivered to the Address Bus 560 by way of logical gating circuits 504, 506 and 508. Simultaneously, the Load Enable line of the Current Address Register 540 is made active by logical gating circuits 549 and 552 causing the numerical address value contained in the Master End Location Register 500 to be entered into the Current Address Register 540. At the next $T_B$ phase time $t_3$, the contents of the Current Address Register 540 are incremented by one unit by way of logical gating circuits 544 and 550. This forms the starting address for entering the response message into storage.

At the next $T_C$ phase $t_5$ time, the Response Latch 433 is set through logical gating circuits 413, 423 and 426.

At the next $T_A$ phase $t_1$ time, the S/P Converter Output Control is enabled by way of an AND gating circuit 604 and an OR gating circuit 606 delivering the contents of the converter circuit 148 to the DATA BUS 160. Simultaneously, through the gating circuit 606 the Data Register 620 is enabled to load data from the Data Bus 660. Thereby, the contents of the converter are entered into the DATA REGISTER 620.

At the next $T_B$ phase $t_3$ time, a storage cycle is generated by logical gating circuits 630 and 632, the contents of the Current Address Register 540 are delivered to the Address Bus 560 by logical gating circuits 530, 536 and 538, and the contents of the DATA REGISTER 620 are entered into the Storage Circuit 110 at the address contained in the Current Address Register 540, and the address on the address bus is entered in the Response End Location Register 520 by way of the AND gating circuit 514.

At the following $T_C$ phase $t_5$ time, the Current Address Register 540 is incremented by one unit through logical gating circuits 542 and 550 forming the address for the next entry.

At $T_F$ phase $t_{11}$ time, if any of the operator control switch settings have changed, the control reverts to the IDLE mode. The Response End Location is stored in the Response End Location Register 520 and can be used on playback to de-limit the message.

If the switch status has not changed, the system is still in RECORD RESPONSE mode and upon completion of deserializing, the next data word in the S/P Converter Circuit 148, as triggered by the pulse at $T_A$ phase time $t_1$, the above events repeat until the operator RECORD RESPONSE switch 183 is deactuated.

PLAYBACK MASTER

The following sequence of operations occur when the PLAYBACK MASTER switch 182 is actuated:

At the first $T_F$ phase time $t_{11}$ the switch de-bounce flip flop circuit 402 is set, generating the signal PLAYBACK MASTER by way of AND gating circuit gate 412. This action activates the—DECODE and +READ signals by way of OR gating circuits 437 and 444.

At the next $T_A$ phase time $t_1$, the contents of the Current Address Register 540 will be delivered to the Address Bus 560 by way of logical gating circuits 528, 538 and 530. Initially, the contents will equal zero, since each time the control is in IDLE mode, this register is cleared. Simultaneously a Storage Cycle is initiated by way of logical gating circuits 624 and 632, data is obtained from storage and appears valid on the DATA BUS 160 at $T_B$ time. At $T_B$ phase time $t_3$, the Load Enable signal to the S/P Converter Circuit 148 is made active through gates 608 and 614 and data from the Storage Circuit 110 is entered into the converter circuit 148. The data is shifted from the converter as Serial Data out to the Delta D/DM Circuit 146 for conversion to audio frequency signal.

At $T_C$ phase time $t_5$, the contents of the Current Address Register 540 are compared to the contents of the Master End Location Register 500 by way of gating circuits 522 and 524. If the values are equal, the Limbo Latch circuit 434 is set by way of logical gating circuits 424 and 428. This indicates that the end of the master record has been reached and playback should stop. Setting of the Limbo Latch circuit 434 activates the MUTE switch module 166 quieting the audio. The Limbo Latch circuit 434 remains set inhibiting playback until the PLAYBACK MASTER switch 182 is deactivated, putting the control in IDLE, and resetting the Limbo Latch circuit 434 in response to output from the IDLE OR gating circuit 416.

If the two addresses differ, the Current Address Register 540 is incremented one unit at $T_D$ phase time $t_7$ by way of gating circuits 543 and 550. At the next $T_F$ phase time $t_{11}$, the state of the bank 180 of operator switches is tested and if one has changed, the control goes into IDLE mode. If none of the switches has changed, the above sequence repeats starting at the next $T_A$ phase time $t_1$.

PLAYBACK RESPONSE

The following sequence of events occur when the PLAYBACK RESPONSE switch 184 is activated:

At the first $T_F$ phase time $t_{11}$, the switch de-bounce flip flop circuit 404 is set generating the signal PLAYBACK RESPONSE by way of AND gating circuit 414.

At the next $T_A$ phase time $t_1$, the contents of the Master End Location Register 500 are loaded into the Current Address Register 540 by way of logical gating circuits 506, 508, 504, 548 and 552. At the next $T_B$ phase time $t_3$, the contents of the Current Address Register 540 are incremented by one unit by way of logical gating circuits 546 and 550 to form the starting address location for obtaining the response message from storage for playback. At $T_C$ phase time $t_5$, the Response Latch flip flop circuit 433 will be set through logical gating circuits 414, 423 and 426. At the next $T_A$ phase time $t_1$, the contents of the Current Address Register 540 will be set on to the ADDRESS BUS 560 by way of logical gating circuits 532, 530 and 538 and a storage cycle will be initiated through the gating circuits 626 and 632. At the conclusion of the $T_B$ phase time $t_5$, the data out of STORAGE will be valid and is entered into the S/P Converter Circuit 148 by way of logical gating circuits 612 and 614. The data is shifted from the converter 146 as Serial Data to the Delta M/DM Circuit 146 for conversion to audio frequency signal.

At $T_C$ phase time $t_5$, the contents of the Current Address Register 540 are compared to the contents of the Response End Location Register 520 by way of AND gating circuit 512. If they are equal, the LIMBO LATCH flip flop circuit 434 is set by way of logical gating circuits 424 and 428. This indicates that the end of the response record has been reached and playback should stop. Setting the LIMBO LATCH flip flop circuit 434 activates the MUTE switch module 166 quieting the audio. The LIMBO LATCH flip flop circuit 434 remains set inhibiting playback until the PLAYBACK RESPONSE switch 184 is deactuated, putting the control in IDLE; the IDLE mode resets the LIMBO LATCH flip flop circuit 434 through the IDLE gating circuit 416.

If the values of the two addresses differ, the Current Address Register 540 is incremented one unit at $T_D$ phase time $t_7$ through logical gating circuits 547 and 550. At the next $T_F$ phase time $t_{11}$, the bank 180 of operator switches is tested and if any of the switches has changed, the control goes to IDLE mode. If none has changed, the above sequence repeats starting at the next $T_A$ phase time $t_1$.

Figure 7:
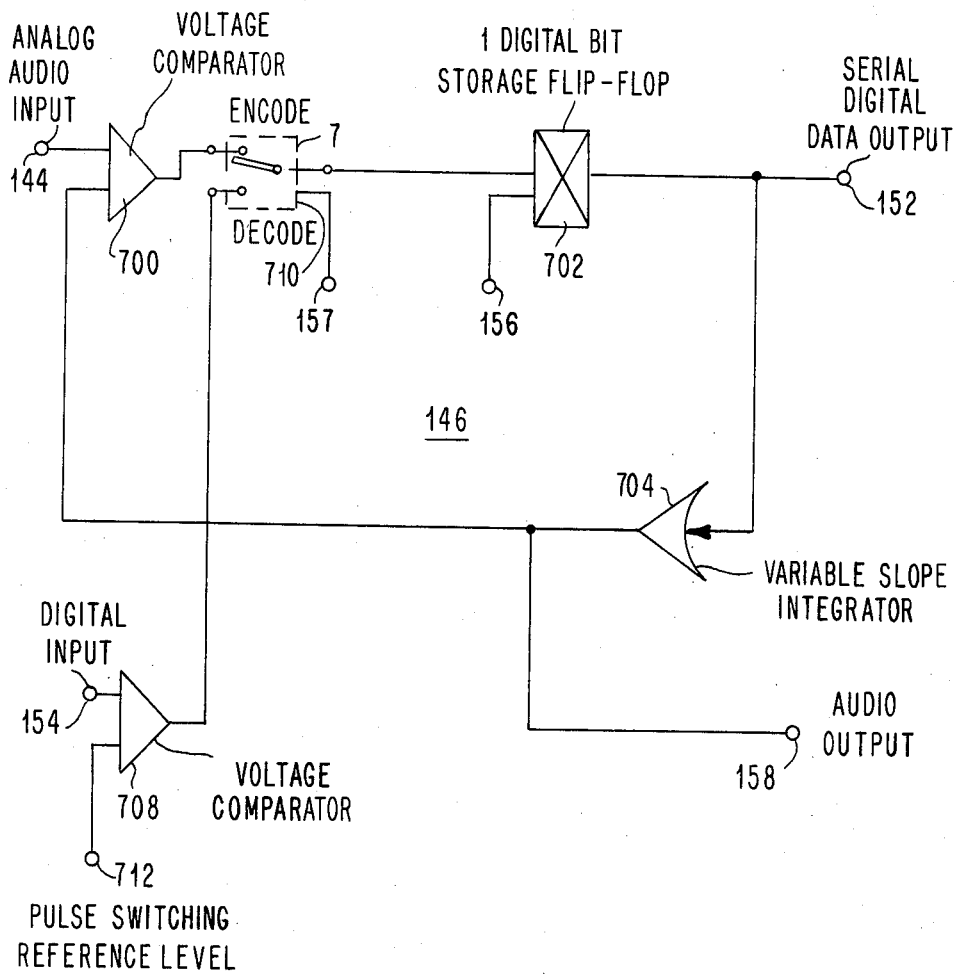
FIG. 7 is a logical circuit diagram of delta modulator circuitry used in the system according to the invention.

FIG. 7 is a more detailed logical diagram of the Delta M/DM circuit shown in FIG. 1. The analog audio signal from the selector switch module is frequency band limited by the BANDPASS FILTER 142 (FIG. 1) and thereafter is applied to the audio input terminal 144 of a voltage comparator circuit 700. This comparator 700, a flip flop circuit 702, a digital input comparator circuit 708, and a variable slope integrator circuit 704 form a continuously variable slope delta Modulator/Demodulator (M/DM) circuit arrangement.

The serial binary sequence output from the flip flop circuit 702 is a digital representation of the audio input and is the input to a serial data input terminal 152 of the S/P Converter circuit 148 shown in FIGS. 1 and 6. During RECORD operations, this data is deserialized and stored in the Storage unit 110.

The output of the VARIABLE SLOPE INTEGRATOR Circuit 704 is a reconstruction of the Audio Input or Digital Input signal and exists whether in the ENCODE (RECORD) or DECODE (PLAYBACK) mode. This AUDIO OUTPUT forms the input for the LOW PASS FILTER 162 shown in FIG. 1 and in RECORD MODE is the side tone that can be passed or suppressed by the MUTE Switch module 166 shown in FIG. 1.

While the invention has been described in terms of an express embodiment, and alternatives have been suggested, it should be understood that those skilled in the art will suggest other changes without departing from the spirit and the scope of the invention as defined in the appended claims concluding the specificiation.

The invention claimed is:

1. Electronic data storing and retrieving apparatus for operation in conjunction with an analog magnetic tape recording and reproducing device of the type having external electromagnetic transducer connecting terminals and having external operating switch connecting terminals, said apparatus comprising the combination of a reversible analog-to-digital data converting circuit, adapted for connection to said transducer connecting terminals, arrangements having analog signal input terminals of said magnetic recording and reproducing device, having analog signal output terminals, and having digital data bus terminals, an electronic digital data storage circuit having digital data bus terminals connected to said converting circuit, and having control electric level input terminals, an electronic control circuit arrangements having digital data bus terminals connected to said storage circuit arrangement, electric control level output terminals connected to the control level input terminals of said storage circuit, and having operator control switch input terminals, and a bank of operator control switches connected to said electronic control circuit switch input terminals of said electronic control circuit arrangement, said converting circuit arrangements comprising a reversible delta modulator/demodulator circuit having analog signal input terminals adapted for connection to the analog signal input terminals of the converting circuit arrangement, analog signal output terminals for connecting to a monitoring device, digital data output terminals, and serial digital input terminals, and a series/parallel converting circuit having a digital input terminal connected to the digital output terminal of said delta modulator/demodulator circuit, a series digital output terminal connected to the digital data input terminal of said modulator/demodulator circuit, and parallel digital data bus terminals.

2. Electronic data storing and retrieving apparatus as defined in claim 1 and wherein said delta modulator/demodulator circuit comprises a potential comparator circuit having one input terminal connected to the analog input terminal of said modulator/demodulator circuit, having another input terminal and having an output terminal, a single-pole-double-throw electronic switch module having one terminal connected to the output terminal of said comparator circuit, having another terminal and having an arm terminal, a set-reset flip-flop circuit having a set terminal connected to the arm terminal of said comparator circuit, a reset terminal connected to a clocking wave input terminal, and having an output terminal connected to the serial digital output terminal of the modulator/demodulator circuit, a variable slope integrator circuit having an input terminal connected to the output terminal of said flip flop circuit and having an output terminal connected to the analog output terminal of the modulator/demodulator circuit and to said other input terminal of said potential comparator circuit, and another potential comparator circuit having one input terminal connected to said digital input terminal of the modulator/demodulator circuit, having another input terminal connected to a point of pulse switching reference potential, and having an output terminal connected to said other input terminal of the first said comparator circuit.

3. Electronic data storing and retrieving apparatus as defined in claim 1 and wherein a band pass filter circuit is interposed between the input terminal of said modulator/demodulator circuit and the input terminal of said converting circuit.

4. Electronic data storing and retrieving apparatus as defined in claim 1 and wherein a low pass filter circuit and an attenuator are interposed between said analog output terminals of said modulator/demodulator and of said converting circuit.

5. Electronic data storing and retrieving apparatus as defined in claim 1 and wherein a muting switch module is shunted across said analog output terminals of said converting circuit with a control level lead to said electronic control circuit.

6. Electronic data storing and retrieving circuitry as defined in claim 1 and wherein a microphone translating circuit having an input adapted for connection to a microphone and having an output terminal and a single-pole-double-throw electronic switch module is interposed between said recording and reproducing device terminals and said input terminal of said converting circuit.

7. Electronic data storing and retrieving apparatus as defined in claim 1 and wherein said electronic control circuit comprises a clocking wave signal generating circuit, a current address register, a first end data location register and a second end data location register, a binary data comparing circuit connected selectively to both of said registers by a common address bus, said operator control switches being so connected through logical circuitry that the address in only one of said first and said second end data location registers is compared with that in said current address register, logical circuitry connected to said current address register for incrementing one unit at a time in synchronism with said clocking wave generating circuit, a limbo latch flip flop circuit having a set input terminal connected to said comparing circuit for actuation thereby upon the addresses being compared being equal, thereby to actuate said limbo latch for putting the circuitry in condition for the following step.

8. Electronic data storing and retrieving apparatus particularly for but not limited to the learning of speech comprising, a source of master audio frequency information bearing electric waves, a transducer for converting the speech of a student to an imitating audio frequency information bearing electric wave, a selector switch module connected to said source and said transducer for selecting one of the resultant waves, a reversible binary analog-to-digital modulator/demodulator circuit connected to said selector switch for producing a train of binary data in response to the selected wave applied to the input of said modulator/demodulator circuit, a reversible series/parallel data converting circuit having a series data input terminal connected to said modulator/demodulator circuit, a series data output terminal and parallel data terminals for delivering data over a parallel data bus in response to serial data received at said input terminal and for delivering data in series at said output terminal in response to data received in parallel over said bus, an electronic data storage circuit connected by a parallel data bus to said parallel data terminals of said converting circuit, having a multiple of addressable storage locations equipped with input circuitry for storing binary data and having output circuitry for delivering the binary data on order in response to electric control levels delivered at control level input terminals, electronic control circuitry having operator control switch input terminals, having electric control level output terminals connected to said selector switch module, to said modulator/demodulator circuit and to said storage circuit, and having a current address register with an output parallel data bus connected to said storage circuit, logical circuitry for initiating a current address in said register, for gating the storage circuitry to said parallel data bus in response to control levels at said switch input terminals, and a plurality of manual operated operators switches for the student controlling the learning, thereby permitting a student to store a particular phrase obtained from the master source in the electric storage circuit, use the transducer to imitate a like phrase and store it in said storage circuit at a different location, and to alternately retrieve each stored phrase and study the difference in the two.

9. Electronic data storing and retrieving apparatus particularly for but not limited to the learning of speech as defined in claim 8 and wherein said source of master audio frequency information bearing electric waves is a conventional magnetic tape recorder, and said transducer for converting the speech of a student to an imitating audio frequency information bearing electric wave is a conventional microphone.

10. Electronic data storing and retrieving apparatus as defined in claim 8 and wherein said modulator/demodulator circuit has an analog data output terminal and a serial data input terminal connected to the serial data output terminal of said converter circuit, an analog signal responsive transducer connected to the analog data output terminal of said modulator/demodulator circuit, thereby enabling the student to hear the information stored in the electronic storage circuit upon retrieval.

11. Electronic data storing and retrieving apparatus as defined in claim 10 and wherein a low pass filter is interposed between the analog data output terminal of the modulator/demodulator circuit and the analog signal responsive transducer.

12. Electronic data storing and retrieval apparatus as defined in claim 8 and wherein a band pass filter is interposed between said selector switch module and the input terminal of said modulator/demodulator circuit.

13. Electronic data storing and retrieval apparatus as defined in claim 11 and incorporating an electronic switch module having switch terminals connected across the input circuit to said signal responsive transducer and an electric control level input terminal connected to said electronic control circuit, thereby selectively to mute said transducer.

14. Electronic data storing and retrieving apparatus particularly for the learning of speech comprising recorder input terminals adapted for connection to the audio frequency wave output signal of a conventional tape recorder, microphone input terminals adapted for connection to a conventional microphone, a selector switch module having input terminals individually connected to said recorder and said microphone input terminals and having control and output terminals, a reversible analog-to-digital data converting circuit having input terminals connected to said output terminals of said selector switch module and having parallel binary data bus terminals, having analog signal output terminals, and having electric control level input terminals, an electronic binary data storage circuit having parallel binary data bus terminals connected to said parallel binary data bus terminals of said reversible converting circuit, having parallel binary address bus terminals and having electronic control level input terminals, an electronic control circuit having a plurality of manually operated electric switches for controlling the overall apparatus, having parallel binary address bus output terminals connected to said parallel binary address bus terminals of said storage circuit, having a plurality of control electric level output terminals connected to said control electric level input terminals of said storage circuit, having a plurality of other electric control level output terminals connected to said converting circuit, and a further electric control level output terminals adapted for controlling said tape recorder.

15. Electronic data storing and retrieving apparatus as defined in claim 14 and wherein
said converting circuit comprises:
a delta modulator/demodulator circuit arrangement having an analog signal input terminal, a serial bit digital output terminal, a serial bit input terminal, an analog output terminal, a clocking wave input terminal, and an electronic switch module electric control level input terminal, a reversible series/parallel binary data converter circuit having a series binary data input terminal connected to said serial bit digital output terminal of said delta modulator/demodulator circuit, parallel binary data bus terminals, and a serial bit output terminal connected to said serial bit input terminal of said modulator/demodulator circuit, thereby selectively to convert analog input signal to parallel binary data output signal and to reconstitute parallel binary data input signal to analog signal.

16. Electronic data storing and retrieving apparatus as defined in claim 15 and wherein
said delta modulator/demodulator circuit arrangement comprises
an analog signal input terminal connected to an input terminal of a potential comparator circuit having one other input terminal and an output terminal, a selector switch module having one input terminal connected to said output terminal of said comparator circuit, another input terminal and an output terminal, and a terminal connected to said electronic switch module control level input terminal, a single digit set-reset flip-flop circuit having the set terminal connected to the output terminal of said switch module, the reset terminal connected to the clocking wave terminal, and having at least one output terminal connected to a serial data output terminal, a variable slope integrating circuit having an input terminal connected to said output terminal of said flip-flop circuit and having an output terminal connected to an analog output signal terminal and to said other input terminal of said potential comparator circuit, and another potential comparator circuit having one input terminal connected to a digital signal input terminal, another input terminal to which a fixed electric reference level is applied, and having an output terminal connected to said other input terminal of said switch module.

17. Electronic data storing and retrieval apparatus as defined in claim 14 and wherein
a plurality of clocked set-reset flip-flop circuits are individually connected to said manually operated electric switches for controlling contact bounce effects and AND gating circuits are connected to the output terminals of said flip-flop circuits in phasing whereby but one of the AND gating circuits should respond for the selected function and a NOR gating circuit is connected to all of said AND gating circuits for generating an IDLE control level when all of said AND gating circuits are down.

18. Electronic data storing and retrieving apparatus as defined in claim 14 and incorporating
a square wave generating circuit delivering a fundamental clocking wave for application to said delta modulator/demodulator circuit, a multistage shift register having an input terminal connected to said generating circuits and having a shift pulse input terminal connected to the output terminal of a NAND gating circuit having a number of inverted input terminals equal to the number of stages of the register less one with said input terminals individually connected to successive stages of said register, and having individual output terminals for each stage of the register for phasing the logical operations of the apparatus.

19. Electronic data storing and retrieval apparatus as defined in claim 17 and incorporating
an interim set-reset flip-flop circuit having a set terminal, having a reset terminal connected to said IDLE output line of said NOR circuit and having an erect output terminal, and an inverted output terminal, and a binary comparing circuit coupled to an end location register and a current address register for indicating that the end of play is reached and setting said interim flip-flop circuit, thereby to permit the incrementing of the current address register until comparison is reached and then to hold the apparatus in limbo until the operators switches have been restored.

20. Electronic data storing and retrieval apparatus as defined in claim 14 and incorporating
low band pass and pass filters arranged individually in the analog input lead and the analog output lead of said converting circuit, and an attenuator arranged in the output lead of said converting circuit.

* * * * *